United States Patent [19]
Koro et al.

[11] Patent Number: 6,031,828
[45] Date of Patent: Feb. 29, 2000

[54] RADIO COMMUNICATION SYSTEM

[75] Inventors: Kenji Koro, Tokyo; Tatsuo Takayanagi, Tokorozawa, both of Japan

[73] Assignees: Oki Electric Industry Co., Ltd, Tokyo; Toho Electronics Co., Ltd, Saitama, both of Japan

[21] Appl. No.: 08/838,590

[22] Filed: Apr. 10, 1997

[30] Foreign Application Priority Data

Apr. 10, 1996 [JP] Japan .................................. 8-088053
Oct. 28, 1996 [JP] Japan .................................. 8-284928

[51] Int. Cl.[7] .............................. H04J 3/00; H04J 3/06; H04B 17/00
[52] U.S. Cl. ........................ 370/336; 370/350; 455/67.1
[58] Field of Search .................................. 370/321, 324, 370/350, 503, 337, 332, 336, 347; 375/345, 259; 455/69, 63, 504, 70, 522, 67.1

[56] References Cited

U.S. PATENT DOCUMENTS

| | | | |
|---|---|---|---|
| 4,488,296 | 12/1984 | Yamamoto et al. | 370/324 |
| 5,124,685 | 6/1992 | Hoshikawa | 370/347 |
| 5,491,837 | 2/1996 | Haartsem | 370/337 |
| 5,548,807 | 8/1996 | Ueda | 455/67.1 |
| 5,550,831 | 8/1996 | Tanahashi | 370/321 |
| 5,564,080 | 10/1996 | Eul et al. | 455/69 |
| 5,574,984 | 11/1996 | Reed et al. | 455/69 |
| 5,590,409 | 12/1996 | Sawahashi et al. | 455/69 |
| 5,640,396 | 6/1997 | Cudak et al. | 370/337 |
| 5,689,814 | 11/1997 | Hagisawa et al. | 455/69 |
| 5,784,365 | 7/1998 | Ikeda | 370/337 |
| 5,930,235 | 2/1997 | Arai | 370/350 |

FOREIGN PATENT DOCUMENTS 6-21870  1/1994  Japan .

*Primary Examiner*—Chau Nguyen
*Assistant Examiner*—Phuong Chau Ba Nguyen
*Attorney, Agent, or Firm*—Venable; Robert J. Frank

[57] ABSTRACT

A base station transmits a synchronizing signal and a clock and AGC circuits of numerous sub-stations produce AGC voltages for indicating adjustment of gain and adjust levels of received signals converted to an intermediate frequency supplied from a frequency conversion unit on the basis of the AGC voltage so that the levels of the received signals are maintained constant in order that the base station can collect a small amount of data from each of the sub-stations in an extremely short time. A data processing circuit of each sub-station transmits data to the base station at a transmission timing corresponding to an identification number of its own sub-station on the basis of the synchronizing signal and the clock in the received data and a gain control circuit adjusts transmission power on the basis of the AGC voltage.

6 Claims, 15 Drawing Sheets

VARIATION OF RECEIVED INPUTS
DUE TO FADING

TRANSMISSION LEVEL
OF BASE STATION

RECEIVED INPUT OF
SUB-STATION 2-1

INPUT OF DEMODULATOR
OF SUB-STATION 2-1

RELATIVE GAIN OF RECEPTION PROCESSING SYSTEM
(TRANSMISSION PROCESSING SYSTEM) OF SUB-STATION 2-1

RECEIVED INPUT BY BASE STATION OF
TRANSMISSION SIGNAL OF SUB-STATION 2-1

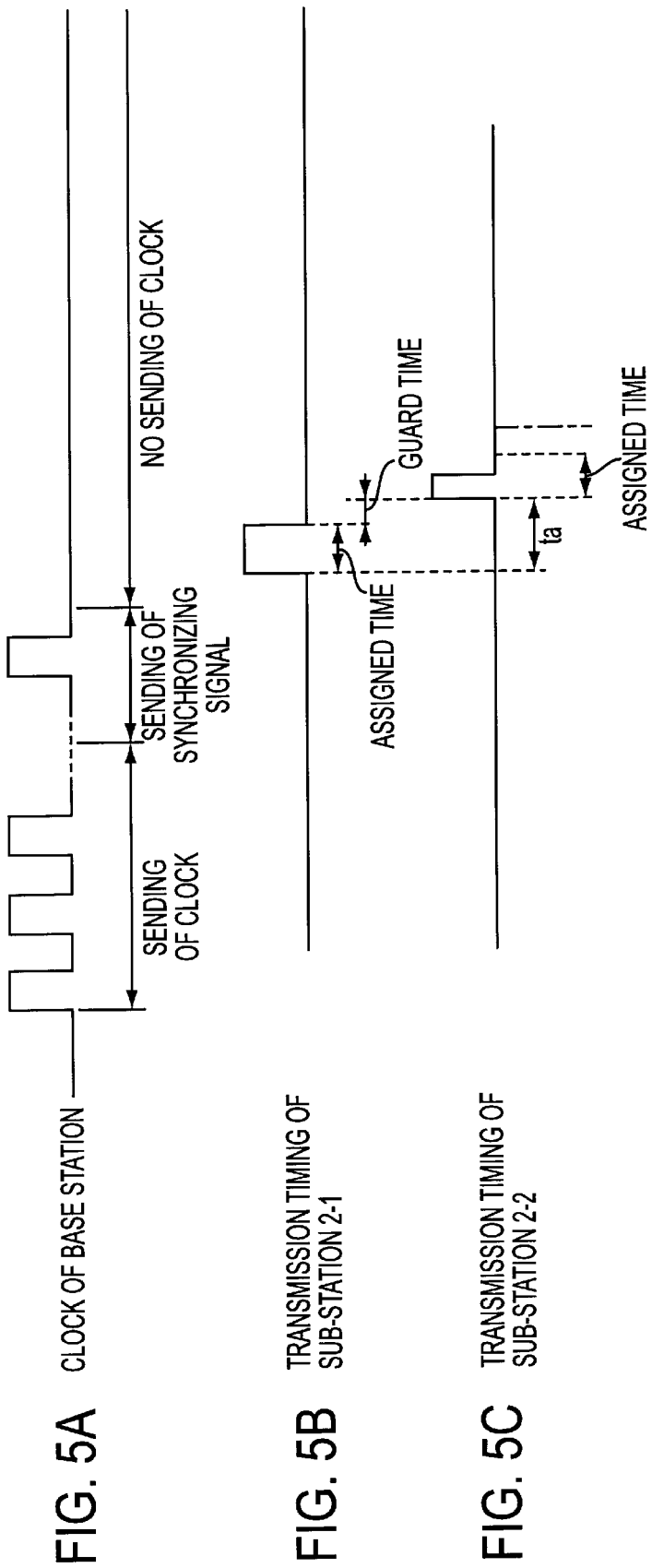

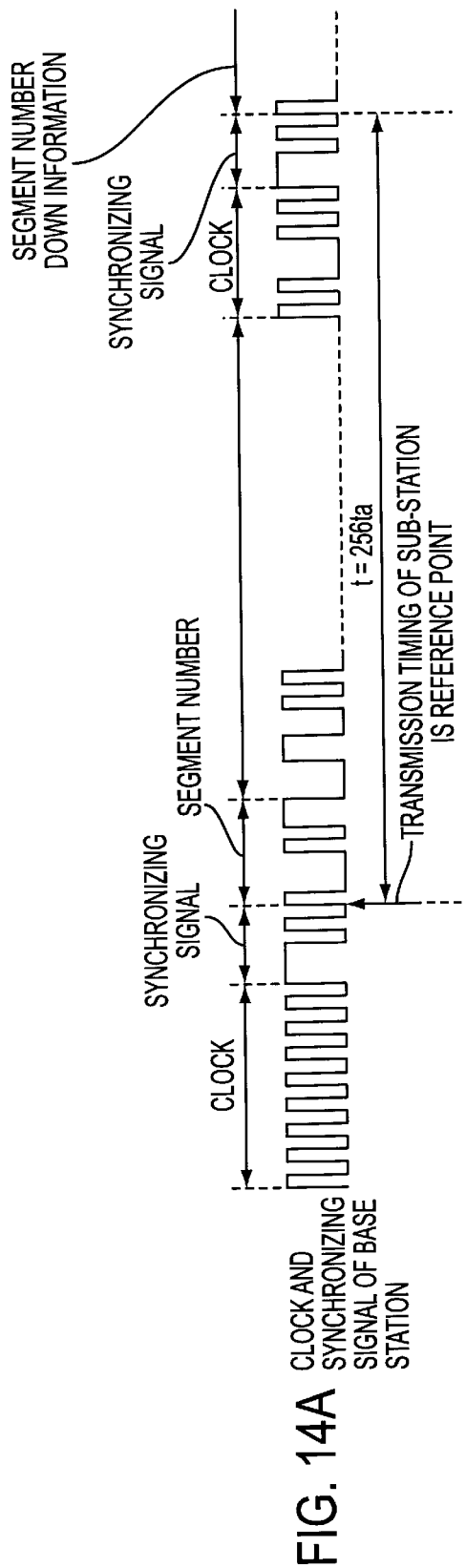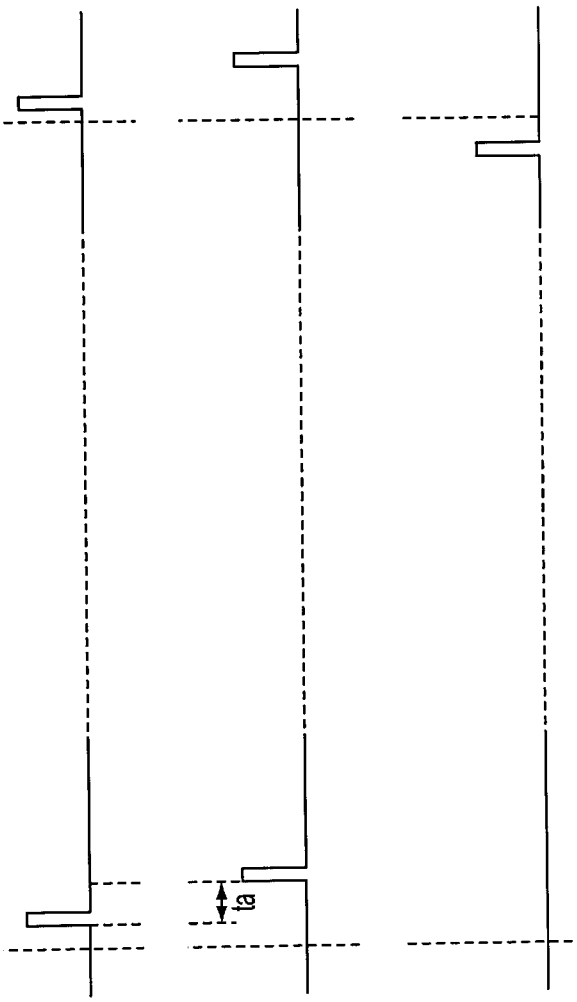

RADIO COMMUNICATION SYSTEM

BACKGROUND OF THE INVENTION

The present invention relates to a radio communication system including a base station and a large number of sub-stations (e.g. tens of thousands to hundreds of thousands of sub-stations) and a radio communication apparatus used in the radio communication system.

Heretofore, there have been communication systems in which data transmitted by radio from a large number of sub-stations is received by a base station to collect data from the sub-stations. As an example thereof, there is known a telemeter system or a telecontrol system which is used for questionnairing TV viewers, for entertainment (for example, participation in a program), for TV shopping, for ensuring the security, for monitoring the safety by gas or electricity supply enterprises, for measurement of the consumption known gas, electricity or water or the like. In such a communication system, when transmission signals are transmitted from a plurality of sub-stations to a base station at the same time, the base station cannot identify the transmission signals from the sub-stations. Accordingly, the transmission from the sub-stations is controlled in accordance with a predetermined data transmission procedure so that the plurality of sub-stations do not transmit the signals at the same time.

In the case of the HDLC (High-level Data Link Control) procedure which is a representative example of the data predetermined transmission procedure, a flag, an address, a control signal and the like constituted by several tens of bits in total are added to an information field constituted by data of, for example, about 256 bits to 2048 bits. In the telemeter system or the telecontrol system as described above, in addition to the above additional information, a bit synchronizing signal, a frame synchronizing signal, an error detection code and the like constituted by several tens of bits are further added.

Furthermore, in the above communication system, bidirectional communication is performed by means of the frequency multiple or time division multiple method. It is necessary to be able to transmit data in one direction (for example, from the sub-station to the base station) whether transmission conditions of data in the other direction (for example, the base station to the sub-station) is good or bad. As confirmation methods of transmission of data, there are known polling methods in which the base station confirms the presence of a transmission request in the sub-stations, a method using the CSMA/CD (Carrier Sense Multiple Access/Collision Detect) method to transmit a request of line connection or information from the sub-station, a method of controlling transmission of data in the sub-station in response to the ACKINAK signal indicating whether the base station can receive transmission data or not, a method of successively shifting the transmission right of data among the sub-stations, and the like.

Any of these methods requires the additional identification information (ID) of an originating station or the addition of an error correction code to data to be transmitted, or the provision of sufficient space (guard time) between data to be transmitted by the sub-stations in the burst manner, or the transmission and receiving of ACK/NAK signal or, the transmission and receiving of a signal indicating shift of the transmission right. In the above communication system, generally, because of the fact that the number of the sub-stations is not so large and data transmitted by the sub-station is about several tens of bits or more, even if the bit synchronizing signal, the frame synchronizing signal, the error correction signal and the ACK/NAK signal are transmitted and received or the guard time is sufficiently ensured, the throughput of data transmission is not degraded greatly.

However, in the method in which the transmission data to which the additional information of several tens of bits as described above is added is transmitted, when data having an extremely short bit length of about two or several bits are transmitted by numerous (for example, several tens of thousands or hundreds of thousands) sub-stations, the length of the additional information added to the transmission data is lengthened as compared with the transmission data and thereby degrades the throughput remarkably. Consequently, in the above conventional method, it is difficult to transmit data by hundreds of thousands of sub-stations in an extremely short time (for example, about several seconds) and receive the data by the base station.

On the other hand, in typical radio communications, the intensity and the phase (incoming phase) of the transmission signal which has reached the receiving station (base station) are vatied due to variation (fading) of loss in propagation of radio waves. When an amount of variation in the intensity and the phase of the transmission signal which has reached the base station exceeds a permissible amount of the receiving system of the base station, data between adjacent time slots interfere with each other and it is difficult to separate the data. The fading due to variation of weather conditions is generally slow in the VHF band and a lower area of the UHF band. However, the variation speed of the fading produced by movement of a reflective object such as airplanes at a long distance is relatively fast. Such a fading having the fast variation speed does not matter when the directivity of an antenna is sharp. However, when the numerous sub-stations are distributed spatially, the so-called long delay distortion that direct waves and reflection waves reflected by a reflective object at a long distance interfere with each other occurs so that reception of data is made difficult since the directivity of the antennas is not so sharp.

In mobile communication systems such as an automobile telephone system and a portable telephone system, since the receiving intensity of the transmission signal is varied depending on a distance between the sub-stations and the base station, the fading and the like, transmission power of the sub-stations is controlled. There is one case where the control of the transmission power of the sub-stations is made by the base station and another case where the control is made by mobile terminals. However, in either case, since the fading speed due to change of a traveling speed of an automobile is very fast and large errors occur (due to either a time difference from detection of the intensity of a received signal to actual control of transmission power or, a difference between a received frequency and a transmission frequency) the transmission power is controlled on the basis of an average received level of the received signal. Accordingly, the transmission power is not controlled finely in such transmission power control schemes. For example, a general control step of the transmission power is coarse. For example, (i.e,. about 4 to 10 dB).

In the communication system in which the transmission signals from the numerous sub-stations are concentrated temporally, such large control steps make it difficult to uniformly control intensity in the case where the transmission signals transmitted from the sub-stations by the above control methods reach the base station, and still avoid the interference between the transmission signals from the sub-stations adjacent to each other in the time relation so that the throughput of data transmission can be improved.

It is an object of the present invention to provide a radio communication system in which a base station can collect data of the short bit number from numerous sub-stations in an extremely short time.

SUMMARY OF THE INVENTION

The radio communication system according to the present invention comprises a base station installed fixedly and for performing communication by radio waves and a plurality of sub-stations fixedly installed within a fixed range about the base station and for transmitting to said base station data of several bits to be collected instantaneously by the base station by radio waves, and the transmission of data to the base station by the plurality of sub-stations is performed in the form of data string in which each of data of the plurality of sub-stations is placed in a previously assigned time slot in a time division multiple access system.

BRIEF DESCRIPTION OF THE DRAWINGS

FIGS. 5(a) through 5(c) are a waveform diagram showing in detail the synchronizing signal from the base station and the transmission timings of the transmission data from the sub-stations;

FIGS. 14(a) through 14(d) are a waveform diagram showing the synchronizing signal from the base station and the transmission timings of the transmission data from the sub-stations in the radio communication system according to the seventh embodiment.

DESCRIPTION OF THE PREFERRED EMBODIMENTS

FIRST EMBODIMENT

Figure 1:
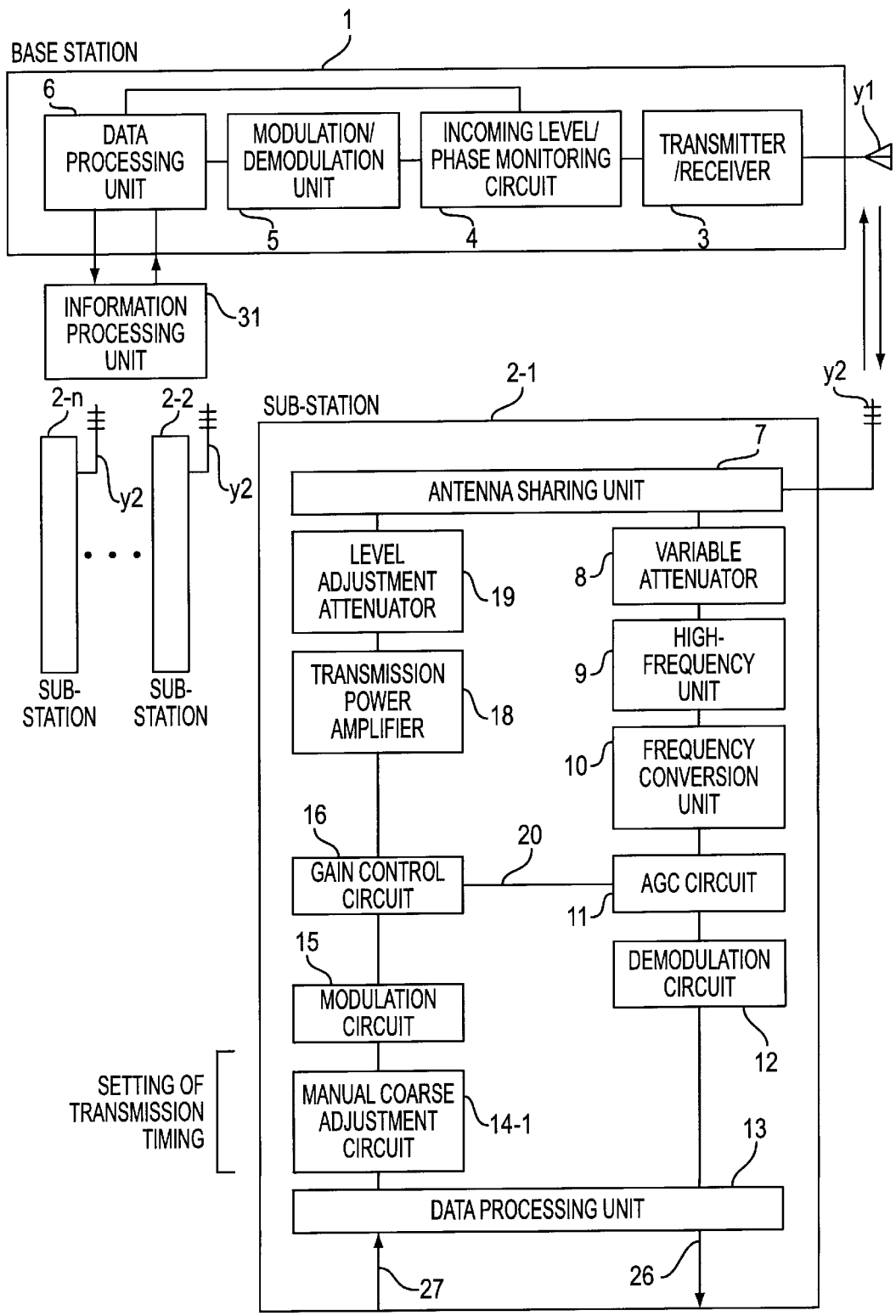
FIG. 1 is a block diagram schematically illustrating a radio communication system according to a first embodiment of the present invention.
Figure 2:
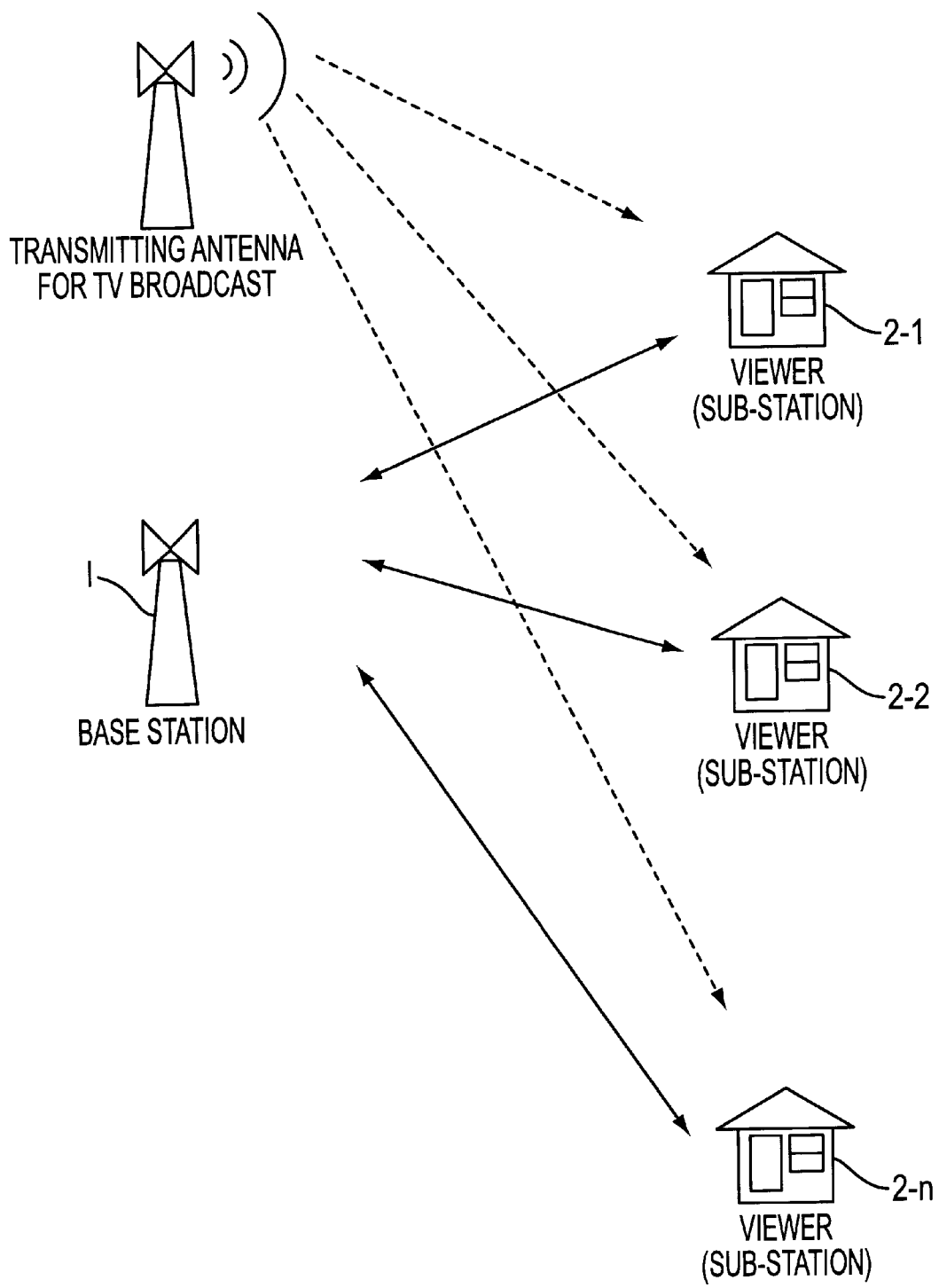
FIG. 2 is a conceptual diagram showing a usage form of the radio communication system.

FIG. 1 is a block diagram schematically illustrating a radio communication system according to a first embodiment of the present invention. The radio communication system comprises one base station and numerous (n, that is, tens of thousands to hundreds of thousands) sub-stations 2-1 to 2-n. The radio communication system is used to questionnaire viewers of the television broadcast by installing the sub-stations 2-1 to 2-n in the viewers' houses as shown in FIG. 2, for example. The base station 1 receives data such as answers from the viewer transmitted by the sub-stations 2-1 to 2-n and supplies the data received from the sub-stations 2-1 to 2-n to an information processing unit 31 or the like connected to the base station 1. In the following description, an answer from one viewer, that is, data transmitted to the base station 1 from each of the sub-stations 2-1 to 2-n is two bits to several bits or so indicating affirmation, denial, reservation or the like. In addition, the present invention is available in continuous monitoring of normal/alarm status in home security system or a telemetering terminal, etc.

The base station 1 includes, as shown in FIG. 1, a transmitter/receiver 3 for performing transmission and reception through an antenna y1, an incoming level/phase monitoring circuit 4 for monitoring incoming level and phase of a transmission signal from the sub-stations 2-1 to 2-n on the basis of a received output of the transmitter/receiver 3, a modulation/demodulation unit 5 for modulating transmission data and demodulating a received signal, and a data processing unit 6 for processing transmission data and received data.

The sub-station 2-1 includes an antenna sharing unit 7 for sharing an antenna y2 by a reception processing system and a transmission processing system, the reception processing system for demodulating a transmitted signal from a base station to reproduce data, and a transmission processing system for preparing a transmission signal to be transmitted to the base station on the basis of data.

The reception processing system includes a variable attenuator 8 for attenuating a signal (high frequency signal) received when the intensity of electric field is high, a (received) high-frequency unit 9 for subjecting the received high frequency signal to band restriction and amplification, a (received) frequency conversion unit 10 for converting the received high frequency to an intermediate amplification frequency, an AGC (Automatic Gain Control) circuit 11 for adjusting an amplitude of the received signal having the converted intermediate frequency, a demodulation circuit 12 for demodulating the received signal to reproduce data, and a data processing unit 13 for performing a predetermined process on the basis of the reproduced data.

The transmission processing system includes a manual coarse adjustment circuit 14-1 for coarsely adjusting a transmission timing of data supplied from the data processing unit 13, that is, for manually adjusting a transmission phase to coarsely adjust a phase of the transmission signal which has reached the base station 1, a modulation circuit 15 for modulating the data from the manual coarse adjustment circuit 14-1 to prepare a modulation signal, a transmission gain control circuit 16 for controlling a gain of the transmission signal to a predetermined level, a transmission power amplifier 18 for amplifying the transmission signal, and a level adjustment attenuator 19 for attenuating a transmission level transmitted from the sub-station to the base station 1 when the base station 1 is near.

Other sub-stations 2-2 to 2-n are also configured in the same manner as the sub-station 2-1. Different identification numbers are assigned to each of the sub-stations 2-1 to 2-n. The identification number is used to control the timing that each of the sub-stations 2-1 to 2-n transmits the transmission signal as described later. The identification number is not added to the transmission signal by the sub-station and is used by the sub-station itself. Further, the identification number is used to control the sub-station by the base station.

In addition, transmission frequencies of the base station 1 and the sub-stations 2-1 to 2-n are set to be extremely close to one another since the antenna is shared for transmission and reception. Further, since the time interval of the transmission from the base station 1 to the sub-stations 2-1 to 2-n and the transmission from the sub-stations 2-1 to 2-n to the base station 1 is short (several seconds to one second or less) as described later, the fading in the (up) transmission from the base station 1 to the sub-stations 2-1 to 2-n and the fading in the (down) transmission from the sub-stations 2-1 to 2-n to the base station 1 are interrelated In the radio communication system thus configured, the operator adjusts the manual coarse adjustment circuit 14-1 in accordance with a distance from the base station 1 to a sub-station upon installation of the sub-station to adjust the transmission timing of the sub-station so that the incoming timing at the base station 1 of the transmission signal transmitted by the sub-station in accordance with the synchronizing signal from the base station 1 is substantially equal to a predetermined timing.

For example, in the radio communication system shown in FIG. 1, when about 65536 sub-stations 2-1 to 2-n transmit data of about several bits to the base station within about one second, a delay time difference (~200 usec) caused by a difference in distance between the base station 1 and the sub-station 2-1 to 2-n is larger than an interval (about 10 usec) between reception of the signals from the sub-stations 2-1 to 2-n when the difference in distance of the base station 1 and the sub-station 2-1 to 2-n is about 30 km or less. In this case, the manual coarse adjustment circuit 14-1 is adjusted as described above to thereby initialize the timing of transmitting the transmission signal from the sub-station.

In the state in which the transmission timing of each sub-station is adjusted as described above, when the sub-stations 2-1 to 2-n transmit data to the base station 1, the base station 1 generates a clock and a synchronizing signal as shown in FIG. 3(a) by the incoming control circuit 4 and sends the clock and the synchronizing signal to the transmitter/receiver 3. A time t for one period is, for example, several seconds to one second or less. The clock and the synchronizing signal are multiplexed in the time relation as shown in FIG. 3(a) and are phasemodulated, for example, to be transmitted. The sub-stations 2-1 to 2-n separate the clock and the synchronizing signal from the detected received signal. FIG. 3(a) shows the case where it is assumed that information bits from the sub-stations 2-1 to 2-n are 2 bits and guard bit is 1 bit to set a unit time ta to 3 bits, the number of sub-stations n being 65535 ($2^{16}$).

The sub-stations 2-1 to 2-n control the transmission timing of the transmission signal on the basis of the clock and the synchronizing signal from the base station 1 and transmit the transmission data at the timings corresponding to the respective identification numbers of the sub-stations as shown in FIGS. 3(b) to 3(d).

When the received level of the reception signal (clock and synchronizing signal) received through the antenna y2 and the antenna sharing unit 7 is larger than a predetermined value, the variable attenuator 8 of the sub-stations 2-1 to 2-n attenuates the received signal to supply it to the high-frequency circuit 9. The high-frequency circuit 9 subjects the received high frequency signal to the band restriction and the amplification and supplies it to the frequency conversion unit 10. The frequency conversion unit 10 converts the received high frequency signal to the intermediate amplification frequency and supplies it to the AGC circuit 11.

Figure 4A:
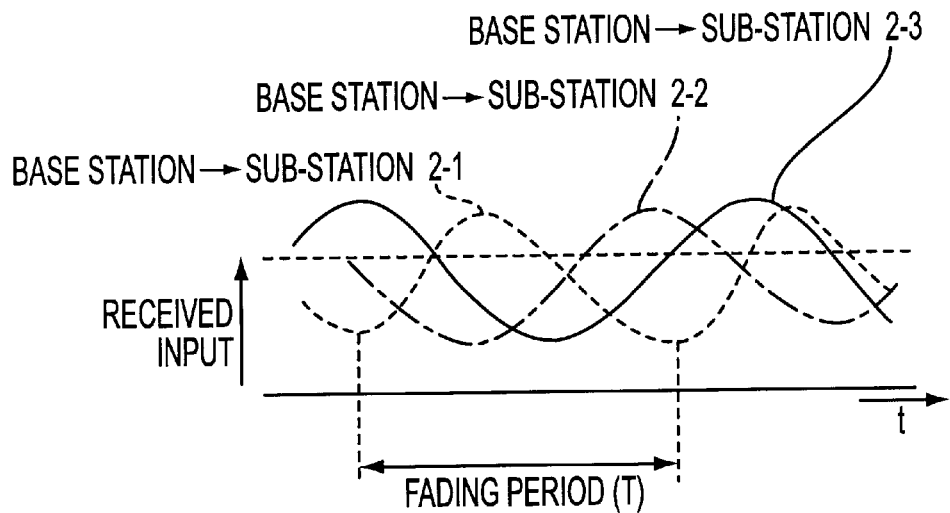
FIGS. 4(a) through 4(f) are a waveform diagram for explaining operation of the radio communication system.
Figure 4B:
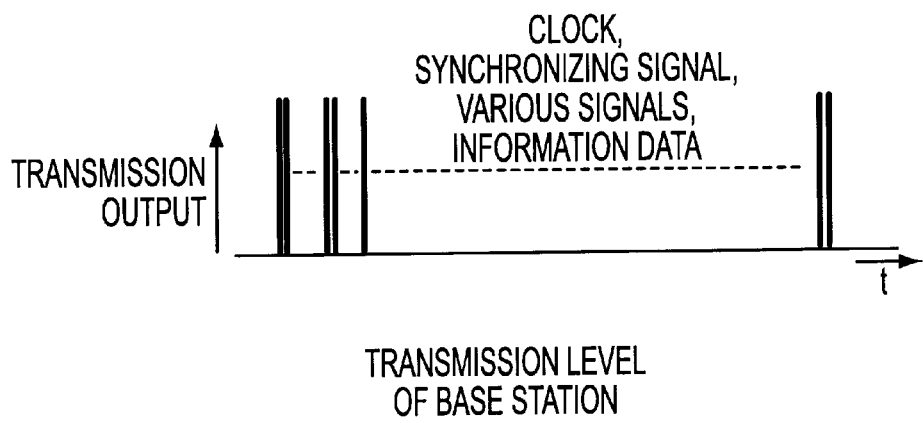
Figure 4C:
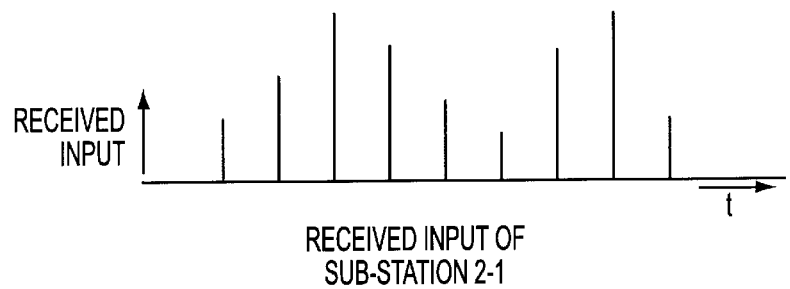

The transmission signal (clock and the like) transmitted at a fixed transmission level by the base station 1 as shown in FIG. 4(b) is influenced by the fading having the time dependency different for each of the sub-stations 2-1 to 2-n and the intensity thereof is varied when the transmission signal is received by the sub-stations 2-1 to 2-n. Accordingly, the received input of the sub-station 2-1, for example, is varied as shown in FIG. 4(c).

Figure 4D:
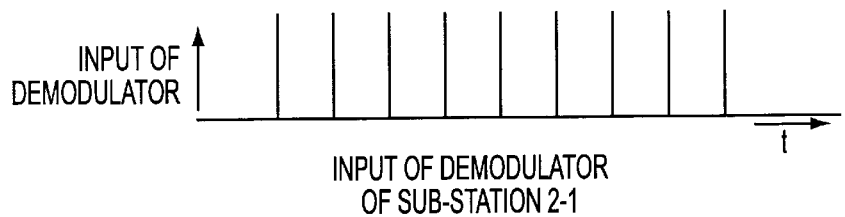
Figure 4E:
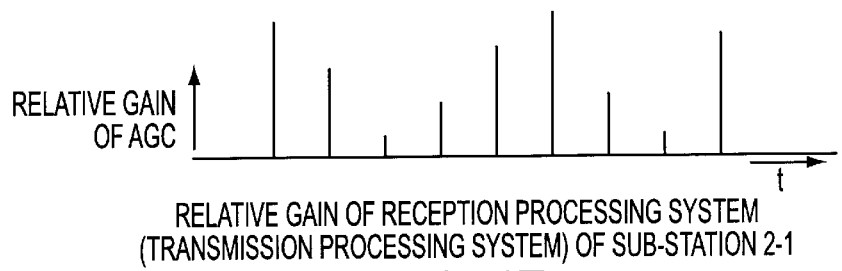
Figure 4F:
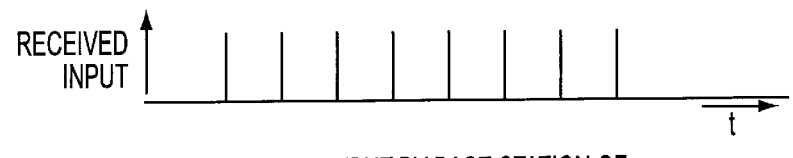

The AGC circuit 11 of the sub-station 2-1 detects a received level of the received signal supplied thereto to produce an AGC voltage (current) indicating adjustment of the gain in accordance with the detected received level and performs adjustment on the basis of the voltage so that the level of the received signal is equal to a predetermined value. Consequently, the received signal having the level adjusted to be a predetermined level as shown in FIG. 4(d) is supplied to the demodulation circuit 12. As shown in FIG. 4(e), the relative gain of the AGC circuit 11 at this time has the inverse proportional relation to variation of the received level shown in FIG. 4(c). The AGC circuit 11 supplies the AGC voltage (current) 20 corresponding to the relative gain of the AGC circuit 11 to the gain control circuit 16.

The demodulator circuit 12 demodulates the received signal and separates it into the clock and the synchronizing signal. The data processing unit 13 detects the transmission timing corresponding to the identification number assigned to the sub-station in accordance with the separated clock and synchronizing signal and transmits the transmission data at this detected transmission timing. In the detection of the transmission timing, for example, a clock synchronized with the above clock is generated to be counted after supply of the synchronizing signal and the timing that the count corresponds to the identification number of the sub-station 2-1 is detected as the transmission timing. The transmission data sent by the data processing unit 13 is supplied to the modulation circuit 15 through the manual coarse adjustment circuit 14-1 for coarsely adjusting the transmission timing on the basis of the above set value. The modulation circuit 15 phase-modulates the transmission data and supplies the modulated data to the gain control circuit 16.

The gain control circuit 16 adjusts the transmission level of the transmission signal on the basis of the AGC voltage (current) 20 supplied from the AGC circuit 11. That is, when the received level of the received signal shown in FIG. 4(c) is low, the AGC gain shown in FIG. 4(e) is increased, so that the gain control circuit 16 increases the transmission level of the transmission signal. Further, when the received level of the received signal shown in FIG. 4(c) is high, the AGC gain shown in FIG. 4(e) is reduced and accordingly the gain control circuit 16 reduces the transmission level of the transmission signal.

In this communication system, as described above, the transmission frequencies of the base station 1 and the sub-stations 2-1 to 2-n are set to be extremely near frequencies and the time t for one period is set to be several seconds to one second. Accordingly, the time until the sub-station 2-1 transmits the transmission signal to the base station 1 after the transmission signal from the base station 1 has been received is equal to or shorter than several seconds to one second at the maximum and the interrelation of fading in the (up) transmission from the base station 1 to the sub-stations and the (down) transmission from the sub-stations 2-1 to 2-n to the base station 1 is extremely high. Accordingly, by controlling the transmission level of the transmission signal on the basis of the relative gain of the AGC circuit to the received signal, the reception level received by the base station 1, of the transmission signal from the sub-station 2-1 can be made fixed as shown in FIG. 4(*f*).

Similarly, other sub-stations 2-2 to 2-n transmit transmission signals at the respective timings corresponding to their own identification numbers and control the transmission level of the transmission signal. Thus, the signal levels received by the base station 1, of the transmission signal from the sub-stations 2-1 to 2-n can be made fixed.

The received levels of the signal received by the sub-stations 2-1 to 2-n are actually varied depending on difference in distance from the base station 1 and ambient temperature other than the variation due to the fading. However, the sub-stations 2-1 to 2-n control the transmission levels of the transmission signals in accordance with the variation of the received signals from the base station 1 to thereby compensate the variation of the received levels so that the levels of the received signals from the sub-stations 2-1 to 2-n received by the base station 1 can be made fixed.

In the radio communication system, the signal levels received by the base station 1, of the transmission signals from the sub-stations 2-1 to 2-n can be made fixed as described above. When the signal levels received by the base station 1, of the transmission signal from the sub-stations 2-1 to 2-n are not fixed, multiple reflective waves of the signal having a high received level interfere with the transmission signal having a low level. Accordingly, as in this radio communication system, the received levels of the transmission signals from the sub-stations 2-1 to 2-n can be made fixed to thereby reduce interference between the transmission signals from the sub-stations 2-1 to 2-n adjacent in the time relation When the transmitter/receiver 3 of the base station 1 receives the transmission signals from the sub-stations 2-1 to 2-n, the transmitter/receiver 3 supplies the reception timing of the received signals to the data processing circuit 6 and supplies the received signals to the modulation/demodulation unit 5. The data processing circuit 6 detects the sub-stations which have transmitted the transmission signals on the basis of the timing information from the transmitter/receiver 3 and when the received data corresponding thereto and demodulated by the modulation/demodulation unit 5 is supplied to the data processing circuit 6, the received data is stored in a memory area corresponding to the detected sub-station.

The guard times for avoiding interference between the transmission signals are set between the transmission signals from the sub-stations 2-1 to 2-n adjacent in the time relation. The guard times (guard bits) are provided as the margin for identifying data and for identifying transmission sources of the received signals in the base station 1.

If the transmission level control of the transmission signals from the sub-stations 2-1 to 2-n, setting of the transmission timings and shaping of waveforms of the received signals are ideal and uniform, it is not always necessary to provide the guard bits but realization thereof is difficult.

FIGS. 5(*a*) through 5(*c*) show the transmission timings of the transmission signals of the sub-stations 2-1 to 2-n in detail in the case where the clock rate is equal to the symbol rate of the information transmission, and the information bits are lying in the assigned time and the guard bit is lying in the guard time.

Figure 3:
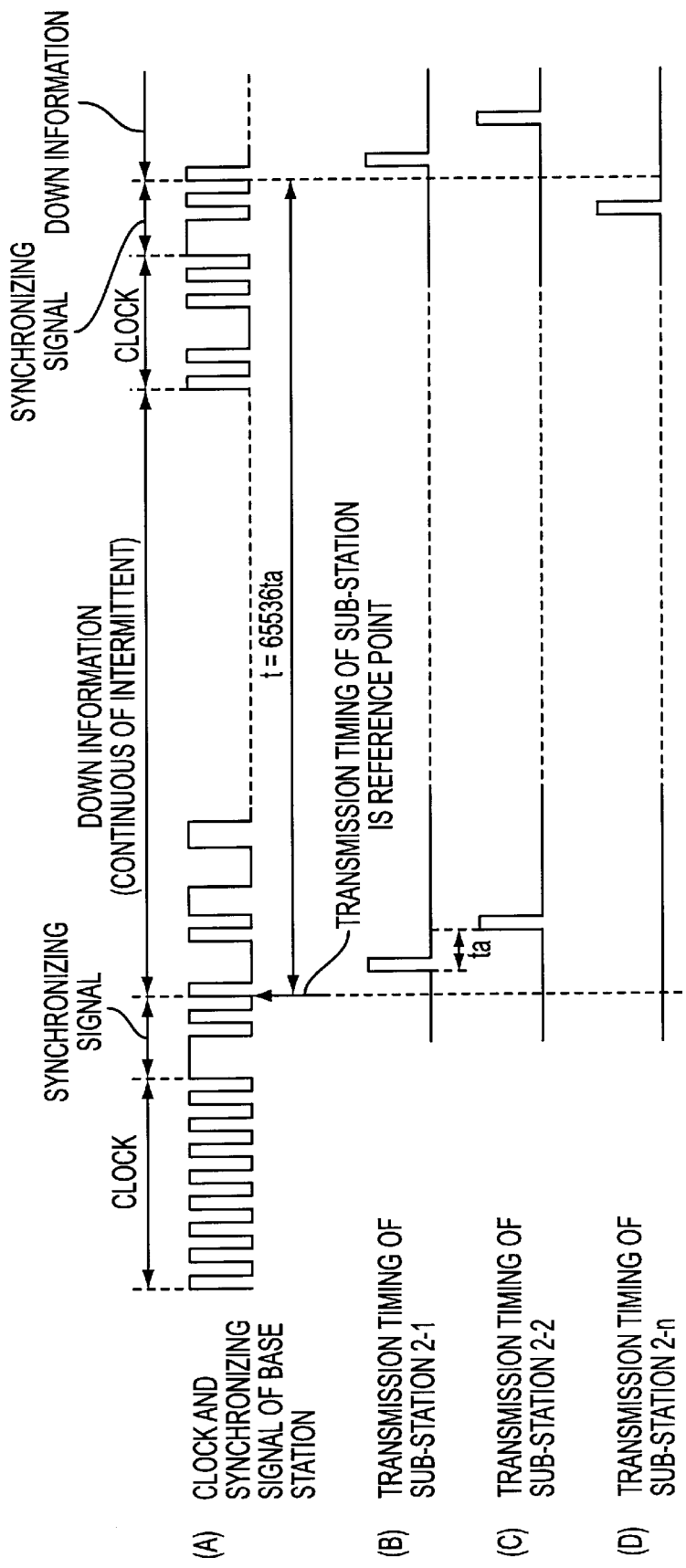
FIG. 3 is a waveform diagram showing the synchronizing signal from the base station and the transmission timings of the transmission data from the sub-stations in the radio communication system.

Further, in this example, as shown in FIG. 5(*a*), the clock is transmitted only during a predetermined period prior to the synchronizing signal shown in FIG. 3(*a*) and is not transmitted during other period. Accordingly, each sub-station generates a clock by itself and when the sub-station receives the clock from the base station, the sub-station synchronizes the phase of the clock generated by the sub-station with that of the received clock by means of a PLL (phase locked loop) circuit.

As described above, the sub-stations 2-1 to 2-n transmit the transmission signals at the transmission timings corresponding to the identification numbers assigned to the respective sub-stations on the basis of the synchronizing signal and the clock transmitted by the base station 1, so that the additional information such as the synchronizing signal and the identification information added to the transmission signals from the sub-stations 2-1 to 2-n in the prior art can be eliminated or the guard bits can be shortened to thereby improve the throughput of data transmission greatly. Accordingly, by using such a radio communication system, data from the numerous sub-stations 2-1 to 2-n can be transmitted to the base station 1 in a short time.

Further, since the received level in the base station 1, of the transmission signal from the sub-stations 2-1 to 2-n is made fixed as described above to thereby be able to reduce the interference between the transmission signals from the sub-stations 2-1 to 2-n, the guard bits can be shortened to improve the throughput of communication.

When numerous sub-stations are dispersed widely and differences in distance from the base station 1 to the sub-stations 2-1 to 2-n are large, the received levels from the sub-stations 2-1 to 2-n are sometimes different by several tens of dB. Thus, it is sometimes difficult to uniformly control the received levels in the base station 1 only by the method of controlling the transmission level from the sub-stations 2-1 to 2-n in accordance with the received level of the transmission signal from the base station 1 as described above. Accordingly, in this radio communication system, the level adjustment attenuator 19 for attenuating a transmission level transmitted from the sub-station to the base station 1 is provided to reduce the received level from the sub-station near to the base station 1 so that the received level from the near sub-station can be balanced to the received level from the sub-station distant from the base station 1. An amount of attenuation by the level adjustment attenuator 19 may be set manually in accordance with a distance from the base station to the sub-station upon installation similarly to the manual coarse adjustment circuit 14-1, for example. Further, the base station 1 may send to the sub-station a correction indication of the transmission level in accordance with the received level in the base station 1 detected by the incoming level/phase monitoring circuit 4 of the base station 1, of the transmission signal from the sub-station and the sub-station may change the transmission level in accordance with the received correction indication.

As described in the above first embodiment, even when the level of the transmission signal is adjusted on the basis of the level of the received signal, the level received by the base station 1, of the transmission signal from the sub-stations 2-1 to 2-n is sometimes non-uniform due to variation of gains of the AGC circuit 11 and the gain control circuit 16 caused by the secular change, for example.

SECOND EMBODIMENT

Figure 6:
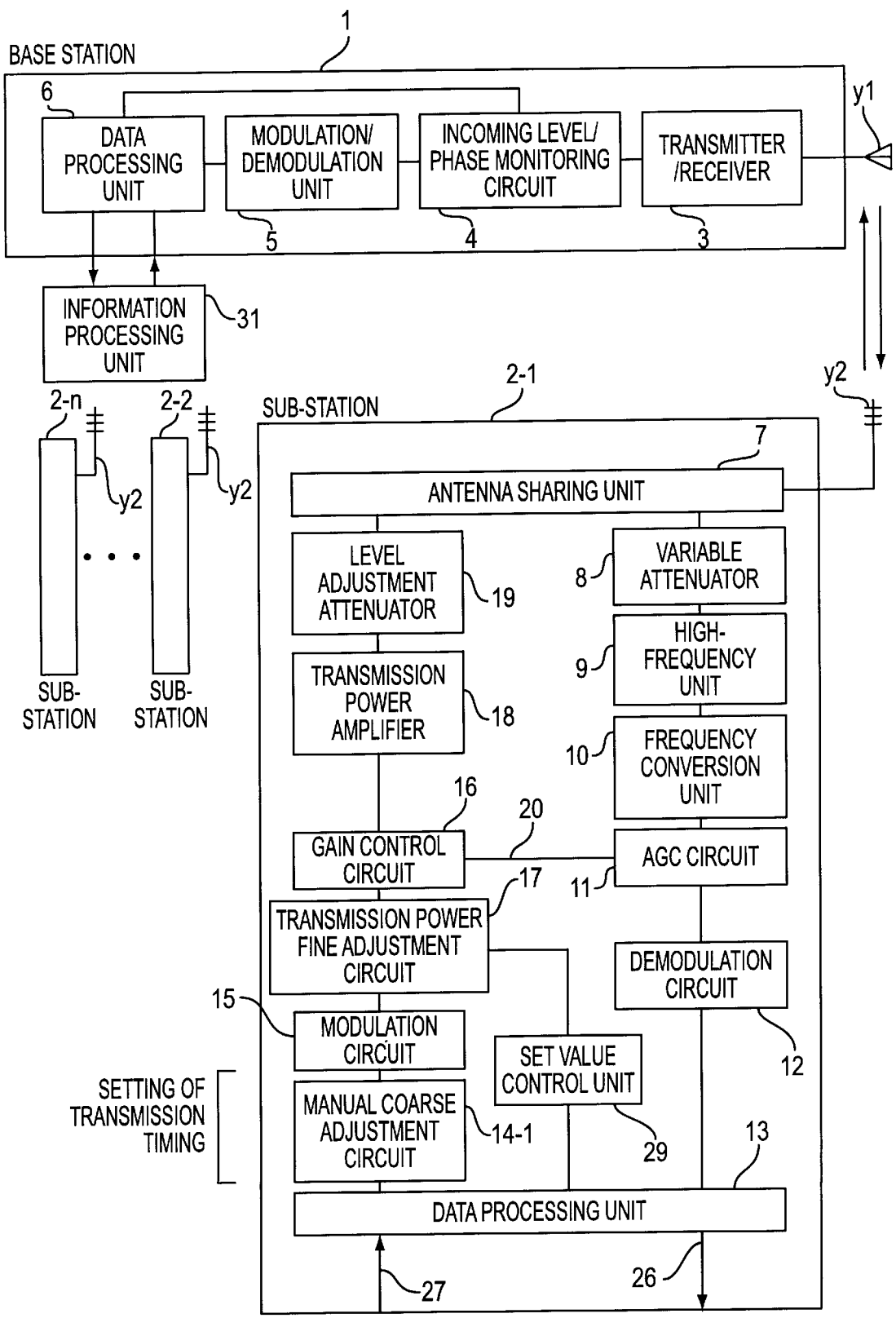
FIG. 6 is a block diagram schematically illustrating a radio communication system according to a second embodiment of the present invention.

In the radio communication system according to the second embodiment of the present invention, as shown in FIG. 6, each of the sub-stations 2-1 to 2-n includes a transmission power fine adjustment circuit 17 for finely adjusting transmission power and a set value control unit 29 for controlling the transmission power fine adjustment circuit 17 on the basis of information (set value) for indicating a fine adjustment width of the transmission power extracted from the received data from the base station 1, in addition to the configuration shown in FIG. 1. Like or corresponding constituent elements to those of FIG. 1 are represented by the same reference numerals as those of FIG. 1.

In the radio communication system thus constructed, the incoming level/phase monitoring circuit 4 of the base station 1 detects an incoming level received by the base station, of the transmission signal from the sub-stations 2-1 to 2-n when the transmission signal from the sub-stations 2-1 to 2-n is received in the same manner as the first embodiment so that variation of the incoming signal over a long period is detected to determine a fine adjustment width (set value) of the transmission signal from the sub-stations 2-1 to 2-n in accordance with the variation over the long period and the set value is transmitted to the sub-stations 2-1 to 2-n.

The data processing unit 13 which has received the set value supplies a transmission power fine adjustment and set signal 21 to the transmission power fine adjustment circuit 17 to perform fine adjustment of the transmission power. Thus, the transmission power can be corrected in accordance with the indication (set value) from the base station 1.

There is a case where variation of the characteristics of the AGC circuit 11 and the gain control circuit 16 due to the secular change over the long term or error in the initialization in the manual coarse adjustment circuit 14-1 cannot be corrected only by the adjustment of the transmission level of the transmission signal of the sub-stations 2-1 to 2-n by the AGC circuit 11 as shown in FIG. 4, while in this radio communication system since the transmission levels of the sub-stations 2-1 to 2-n can be finely adjusted by control from the base station 1 as described above, the transmission signals from the sub-stations 2-1 to 2-n can be coincident with higher accuracy.

When the transmission signal is remarkably attenuated due to fading, there is considered that the received level in the base station 1 is reduced excessively or distortion of waveform due to the multiple propagation is increased to thereby make the reception difficult. Even if the transmission signal is transmitted in this case, there is considered that the interference between symbols becomes large and the error rate is increased.

THIRD EMBODIMENT

Figure 7:
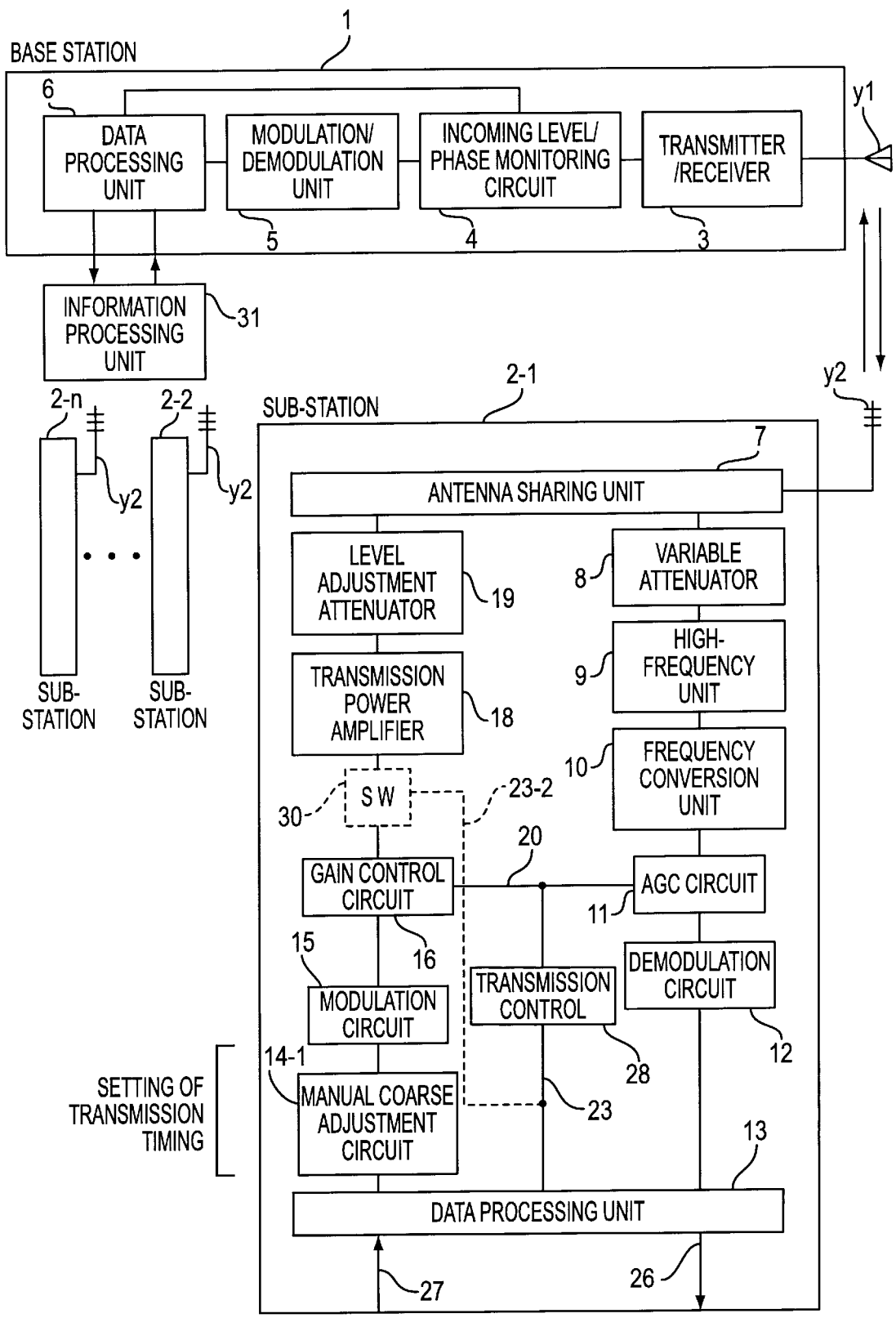
FIG. 7 is a block diagram schematically illustrating a radio communication system according to a third embodiment of the present invention.

In the radio communication system according to the third embodiment of the present invention, as shown in FIG. 7, each of the sub-stations 2-1 to 2-n includes a transmission control circuit 28 for controlling transmission on the basis of the AGC voltage from the AGC circuit 11 and a switch (SW) 30 for controlling supply of an output of the gain control circuit 16 to the transmission power amplifier 18 on the basis of control of the transmission control circuit 28, in addition to the sub-station shown in FIG. 1.

The transmission control circuit 28 produces a transmission reserving instruction signal 23-1 for reserving transmission of data to supply the signal to the data processing unit 13 when the AGC voltage 20 of the AGC circuit 11 exceeds a predetermined value (that is, the received level is lower than a predetermined value) due to fading. When the data processing unit 13 receives the transmission reserving instruction signal 23-1, the data processing unit 13 stops transmission of the transmission data. At this time, supply of the output of the gain control circuit 16 to the transmission power amplifier 18 is stopped by means of the switch 30.

When attenuation of the transmission signal due to fading is made small, the received level of the transmission signal from the base station 1 detected by the AGC circuit 11 is increased and the level of the AGC voltage 20 is reduced. When the level of the AGC voltage 20 is further reduced and is lower than a predetermined value, the transmission control circuit 28 invalidates the transmission reserving instruction signal 23-1 and the data processing unit 13 resumes transmission of the transmission data to the manual coarse adjustment circuit 14-1. At the same time, supply of the output of the gain control circuit 16 to the transmission power amplifier 18 is resumed by the switch 30 and transmission of the transmission data to the base station 1 is resumed.

Thus, in the radio communication system, when the propagation condition becomes worse due to fading or the like, transmission of the transmission signal from the sub-station is stopped and when the propagation condition is recovered, the transmission is resumed. In the conventional communication system, even when the propagation condition of radio waves is worse, the transmission signal is transmitted. Accordingly, the transmission signal cannot be transmitted exactly so that the ACK/NAK operation is repeated frequently and consequently wrong information is transmitted. In the radio communication system, the error detection for the received data is not performed individually and accordingly when the propagation condition is worse, transmission of data is stopped to thereby be able to prevent occurrence of error.

In the radio communication system shown in FIG. 1 or 6, when difference in distance between the base station 1 and the sub-stations 2-1 to 2-n is as short as about 3 km, for example, and the transmission signals from 65536 sub-stations can be received in 5 seconds, difference in a delay time caused by the difference in distance between the base station 1 and the sub-stations 2-1 to 2-n is about 20 usec and error (about 1 usec) after the initialization of the manual coarse adjustment circuit 14-1 does not matter practically. Further, since the difference in the delay time is sufficiently short as compared with the interval of 50 usec between the received signals from the sub-stations 2-1 to 2-n, the fine adjustment function of the transmission timing is not required.

Alternatively, when the difference in the delay time caused by the difference in distance between the base station 1 and the sub-stations 2-1 to 2-n is about 20 usec similarly, the burst length of data transmitted to the base station 1 from the sub-stations 2-1 to 2-n is about several tens bits and the transmission signals from 65536 sub-stations are received in several tens of seconds, the transmission time per bit is about 15 usec. Accordingly, by adding the guard bits of about 2 to 3 bits to the transmission signals from the sub-stations 2-1 to 2-n and transmitting the transmission signals having the guard bits added thereto, the interval between the received signals adjacent in the time relation is about 30 to 45 usec and the fine adjustment function of the transmission timing other than by the manual coarse adjustment circuit 14-1 is not required. In this case, since the guard bits of about 2 to 3 bits are merely added to the data of several tens bits, reduction of the throughput is extremely small.

However, when the numerous sub-stations 2-1 to 2-n are dispersed in a wide area (for example, area having a radius about the base station 1 of 30 km or more), the propagation times of the transmission signals from the base station 1 to the sub-stations 2-1 to 2-n are different. Accordingly, the transmission signals from the sub-stations 2-1 to 2-n reach the base station 1 at the timings delayed in accordance with distances from the base station 1 to the sub-stations 2-1 to 2-n with respect to the timings shown in FIGS. 3(c) to (d).

The delay times are different depending on the distances from the sub-stations 2-1 to 2-n to the base station 1. When the farthest sub-station is distant by 30 km from the base station 1, it takes about 100 usec (for the velocity of light of $3 \times 108^B$ m/sec) until the period signal (synchronizing signal) from the base station 1 reaches this sub-station. Further, since it takes about 100 usec until the transmission signal from this sub-station reaches the base station 1, the transmission signal from this sub-station is delayed by 200 usec with respect to the transmission signal from a sub-station installed in the vicinity of the base station 1 and having the transmission time of about 0.

When the transmission signals from the 65536 sub-stations are desired to be received within one second, a total time ta of the assignment time per each of the sub-stations 2-1 to 2-n and the guard bits is about 15.3 usec. Accordingly, the guard time is about 5 usec. In such conditions, when the error of the reception timings of the transmission signals from the sub-stations 2-1 to 2-n is about 200 usec, the base station 1 cannot identify the sub-stations 2-1 to 2-n corresponding to the received signals.

Accordingly, before the actual data transmission, the initialization must be made so that the error in the transmission timings from the sub-stations 2-1 to 2-n are set within about 1 usec. The error in the transmission timings can be set within 1 usec (corresponding to the error due to a distance of 300 m) shorter than the guard time only by adjustment of the manual coarse adjustment circuit 14-1. However, the fine adjustment of the transmission timings is desirably made by the remote setting from the base station 1 on the basis of a measured result in the base station 1 so that deviation or error in the timing caused by the secular change can be treated.

FOURTH EMBODIMENT

Figure 8:
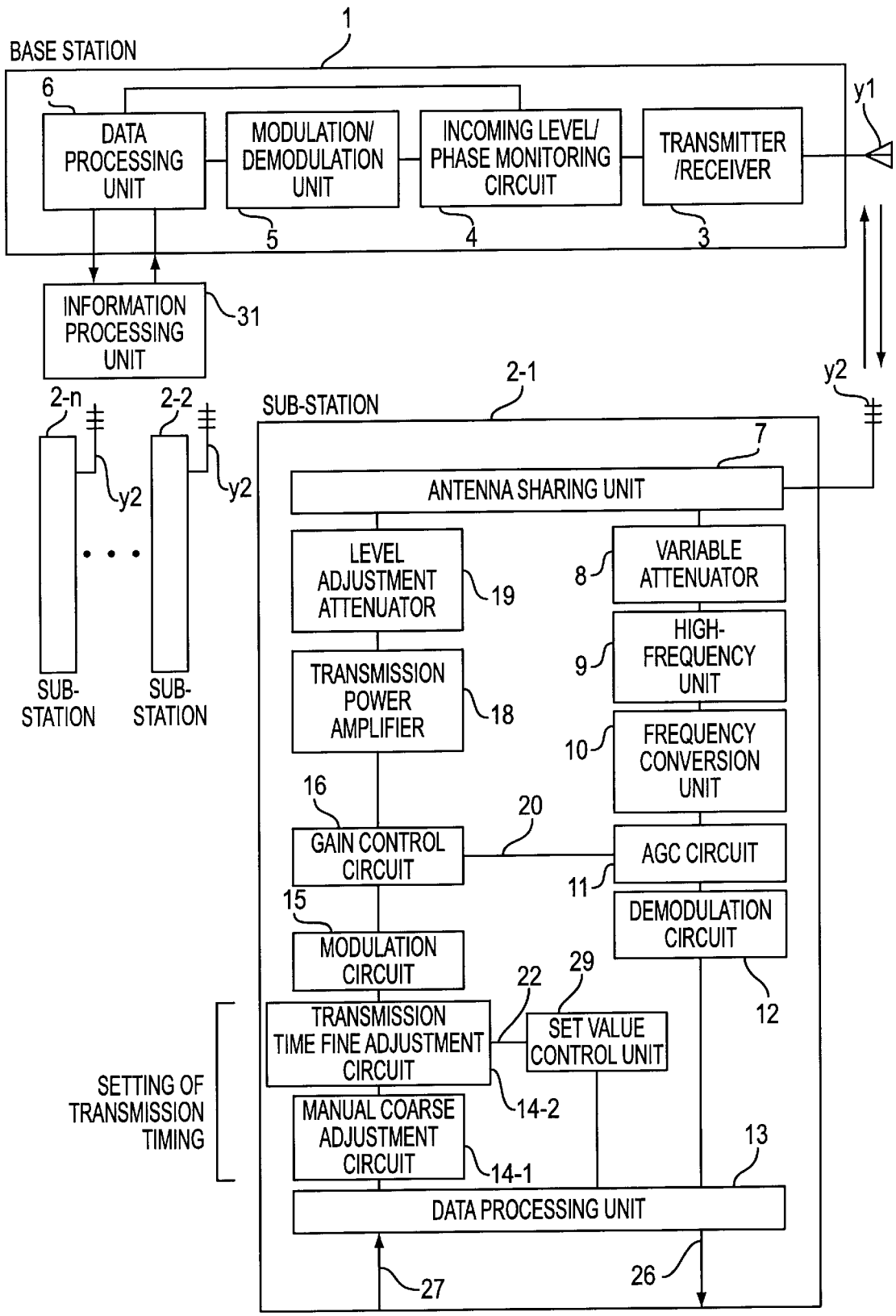
FIG. 8 is a block diagram schematically illustrating a radio communication system according to a fourth embodiment of the present invention.

In the fourth embodiment of the present invention, as shown in FIG. 8, the sub-station includes a remote fine adjustment circuit 14-2 for finely adjusting the transmission timing of the transmission data coarsely adjusted by the manual coarse adjustment circuit 14-1 and a set value control unit 29 for controlling the remote fine adjustment circuit 14-2 on the basis of a transmission time fine adjustment and set signal (set value) extracted by the data processing unit 13, in addition to the configuration shown in FIG. 1.

Figure 9:
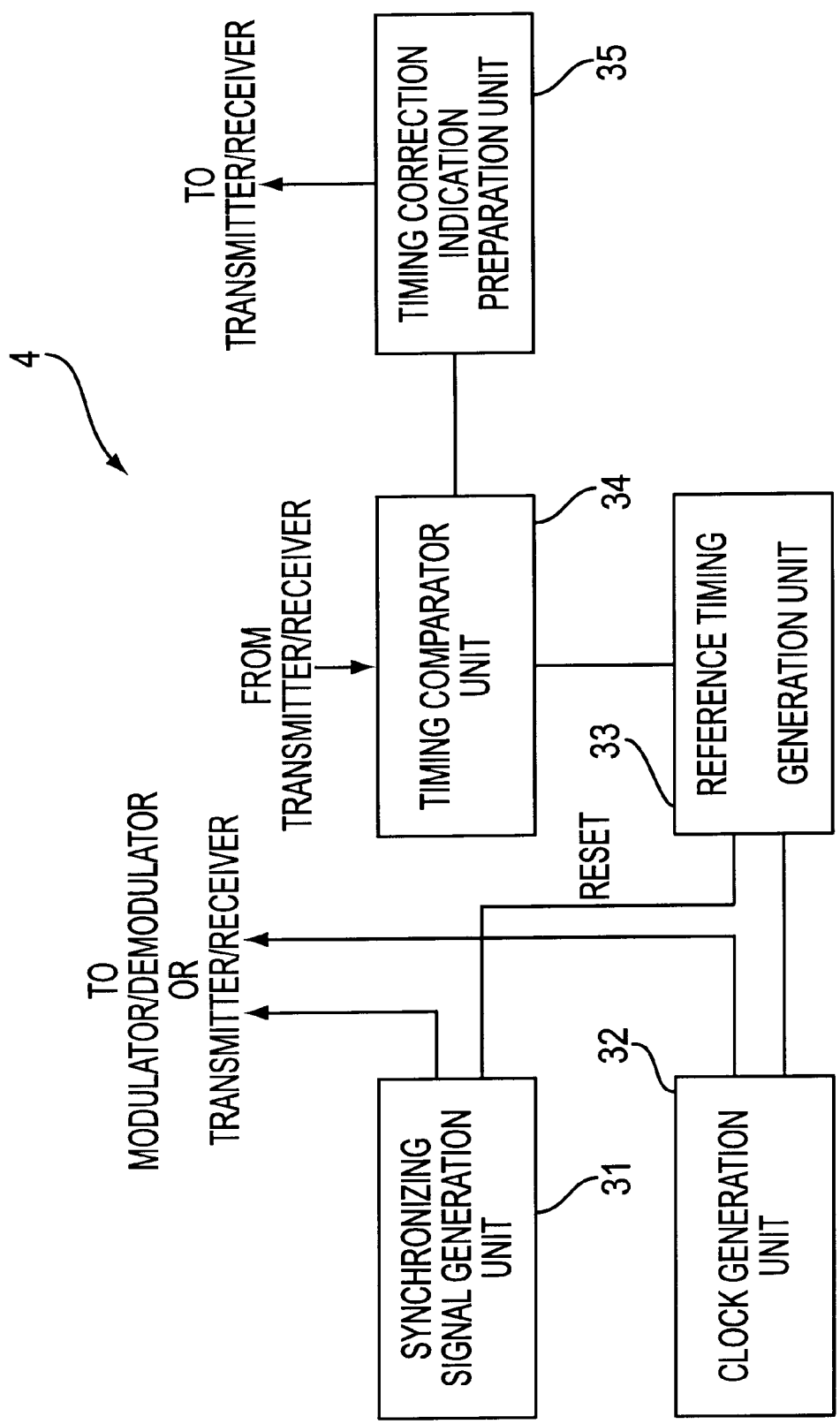
FIG. 9 is a block diagram schematically illustrating an incoming control circuit constituting the radio communication system.

Further, the incoming level/phase monitoring circuit 4 of the base station 1 includes, as shown in FIG. 9, a synchronizing signal generation unit 31 for generating a synchronizing signal, a clock generation unit 32 for generating a clock, a reference clock generation unit 33, a timing comparator unit 34 for comparing the reference clock generated by the reference clock generation unit 33 with a reception timing of the transmission signal from each of the sub-stations 2-1 to 2-n, and a timing correction indication preparation unit 35 for producing correction indication of the transmission timing of the transmission signal from the sub-stations 2-1 to 2-n on the basis of the compared result of the timing from the timing comparator unit 34.

When the transmission timing of each of the sub-stations 2-1 to 2-n is finely adjusted by the base station 1, exact measurement and setting are difficult when signals of other sub-stations exist before and after the transmission timing of the sub-station. Accordingly, it desirable to perform the fine adjustment toward dawn that there is less traffic. When the transmission timings of the sub-stations 2-1 to 2-n are finely adjusted, the data processing unit 6 successively transmits to only one sub-station a transmission permission message for permitting transmission of the transmission signal. At this time, the reference timing generation unit 33 generates a reference timing that the transmission signal is returned from a reference station positioned at a predetermined distance from the base station in response to the transmission of the transmission permission message and supplies the reference timing to the timing comparator unit 34.

When the data processing unit 13 of the sub-stations 2-1 to 2-n receives the transmission permission message, the data processing unit 13 judges whether the received message is a transmission permission message to be transmitted to its own sub-station or not. When it is the message transmitted to its own sub-station, the sub-station returns the transmission signal to the base station 1 at a predetermined timing defined previously to set such a correction value.

When the transmitter/receiver 3 of the base station 1 receives the transmission signal from the sub-station, a detection timing of the transmission signal from the sub-station is supplied to the timing comparator unit 34. The timing comparator unit 34 compares the detection timing from the transmitter/receiver 3 with the reference timing from the reference timing generation unit 33 and the compared output is supplied to the timing correction indication preparation unit 35. When the compared result is within a predetermined permissible error range, the timing correction indication preparation unit 35 does not prepare the timing correction indication and when the compared result is not within the permissible error range, the timing correction indication preparation unit 35 prepares the timing correction indication for correcting the timing that the sub-station transmits the transmission signal and transmits the correction indication through the transmitter/receiver 3 to the sub-station.

When the data processing unit 13 of the sub-stations 2-1 to 2-n receives the timing correction indication thereto, the data processing unit 13 supplies a transmission time fine adjustment and set signal 22 to the transmission time fine adjustment circuit 14-2 to correct the transmission timing of the sub-station. Thus, the transmission timing of the sub-station is adjusted within the permissible range. The base station transmits the transmission permissible message to the sub-station having the corrected transmission timing again to thereby confirm whether the transmission timing is corrected exactly or not. The above adjustment of the transmission timing is performed for all of the sub-stations 2-1 to 2-n to thereby adjust the transmission timings of all of the sub-stations 2-1 to 2-n.

An error shorter than the guard time, for example an error shorter than about 1 usec can be corrected even when transmission of data from the sub-stations 2-1 to 2-n to the base station 1 is performed. The timing comparator unit 34 of the base station 1 shown in FIG. 9 compares the reception timing of the transmission data with the reference timing from the reference timing generation unit 33 when the transmission data from the sub-stations 2-1 to 2-n is received and supplies an error of the reception timing to the timing correction indication preparation unit 35. The timing correction indication preparation unit 35 prepares the timing correction indication on the basis of the error of the reception timing from the timing comparator unit 34 and transmits the prepared timing correction indication to the pertinent sub-station. The sub-station which has received the timing correction indication adjusts its own transmission timing in accordance with the timing correction indication in the same manner as above when the timing correction indication is the indication directed to the sub-station.

In this manner, when transmission of data to the base station from the sub-stations 2-1 to 2-n is performed, the transmission timing of the sub-station having an error in the transmission timing of the transmission signal can be corrected.

Normally, when the modulation/demodulation unit 5 of the base station 1 performs demodulation and detection of data from the received signal, the modulation/demodulation unit compares the received signal with a threshold value at a predetermined timing (demodulation and detection point), for example, to perform demodulation of data, while three or more demodulation and detection points are set before and after the predetermined timing and the error of the reception timing may be detected on the basis of the compared result of the received signals at these modulation and detection points with the threshold value. When the three or more demodulation and detection points are provided in this manner, data cannot be detected at part of the modulation and detection points depending on an error when the reception timing has the error. Accordingly, the error of the reception timing can be detected on the basis of the compared result of the received signal at the modulation and detection point with the threshold value. In this manner, an error of the reception timing from the same sub-station may be measured by plural times and the measured results of the plural times may be subjected to the statistical process to detect the error of the reception timing.

Further, when the sub-stations 2-1 to 2-n are installed in positions where difference in distance from the base station 1 is small, it is sometimes sufficient to merely perform control of the transmission timing from the base station 1 without provision of the manual coarse adjustment circuit 14-1.

FIFTH EMBODIMENT

Figure 10:
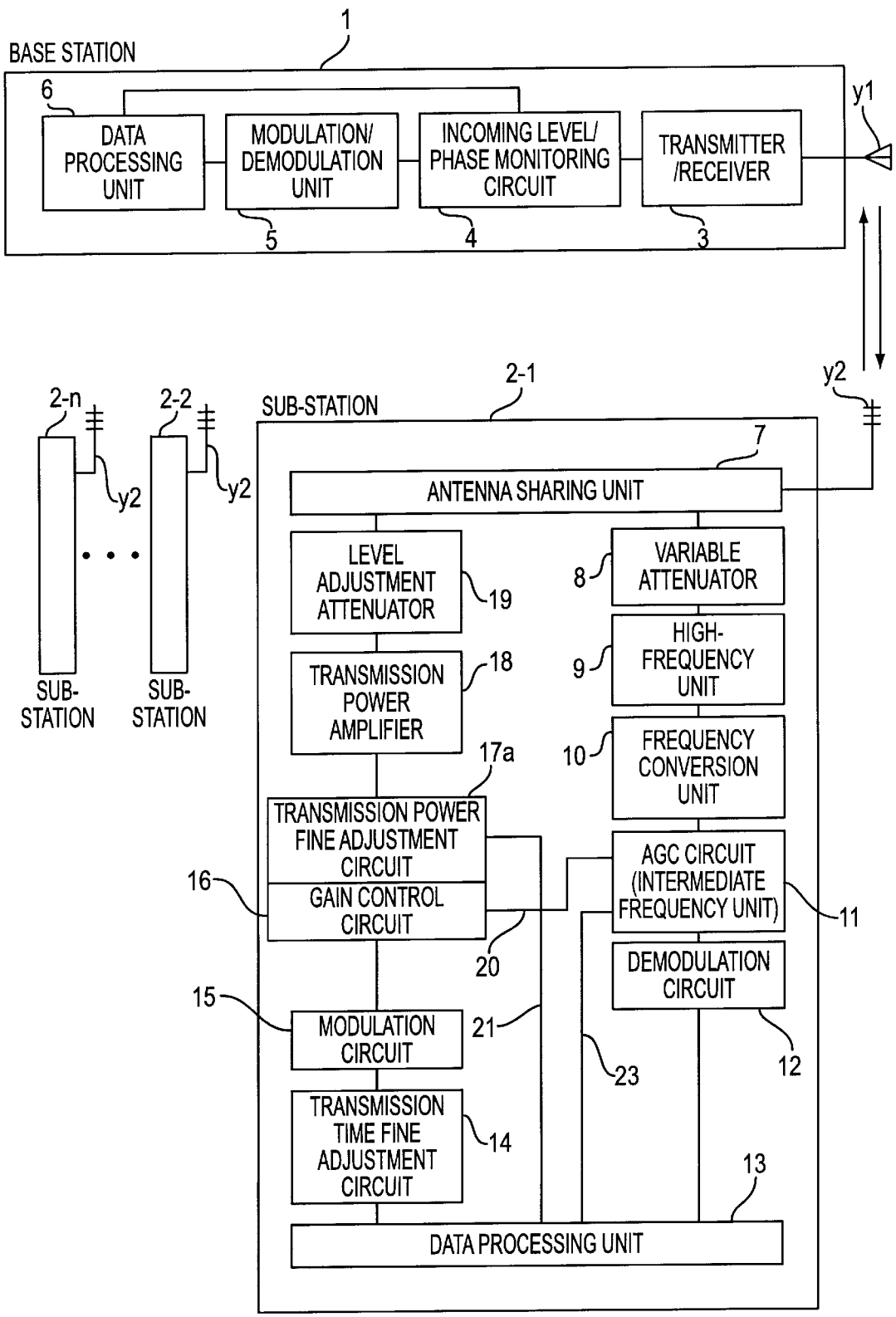
FIG. 10 is a block diagram schematically illustrating a radio communication system according to a fifth embodiment of the present invention.

In the fifth embodiment according to the present invention, as shown in FIG. 10, the manual coarse adjustment circuit 14-1 of FIG. 8 is deleted from the sub-station 2-1 to 2-n and a transmission time fine adjustment circuit 14 similar to the remote fine adjustment circuit 14-2 is provided. The transmission time fine adjustment circuit 14 can finely adjust the transmission time (transmission timing) of the transmission data on the basis of the transmission time fine adjustment setting signal detected by the data processing unit 13.

Further, in this embodiment, the sub-station 2-1 to 2-n is provided with a transmission power fine adjustment circuit 17a similar to the transmission power fine adjustment circuit 17 shown in FIG. 6. The transmission power fine adjustment circuit 17a is different from the transmission power fine adjustment circuit 17 of FIG. 6 and finely adjusts the output of the gain control circuit 16. Further, the transmission power fine adjustment circuit 17a finely adjusts the transmission power on the basis of information (set value) for indicating a fine adjustment width of the transmission power extracted by the data processing unit 13.

As described above, in the radio communication system, since the transmission timing and the transmission power can be adjusted in accordance with control from the base station 1, the received levels of the transmission signals from the sub-station 2-1 to 2-n received by the base station 1 can be uniformed and the reception timings of the received signals from the sub-stations 2-1 to 2-n can be adjusted with accuracy. Accordingly, interference between symbols can be reduced.

SIXTH EMBODIMENT

Figure 11:
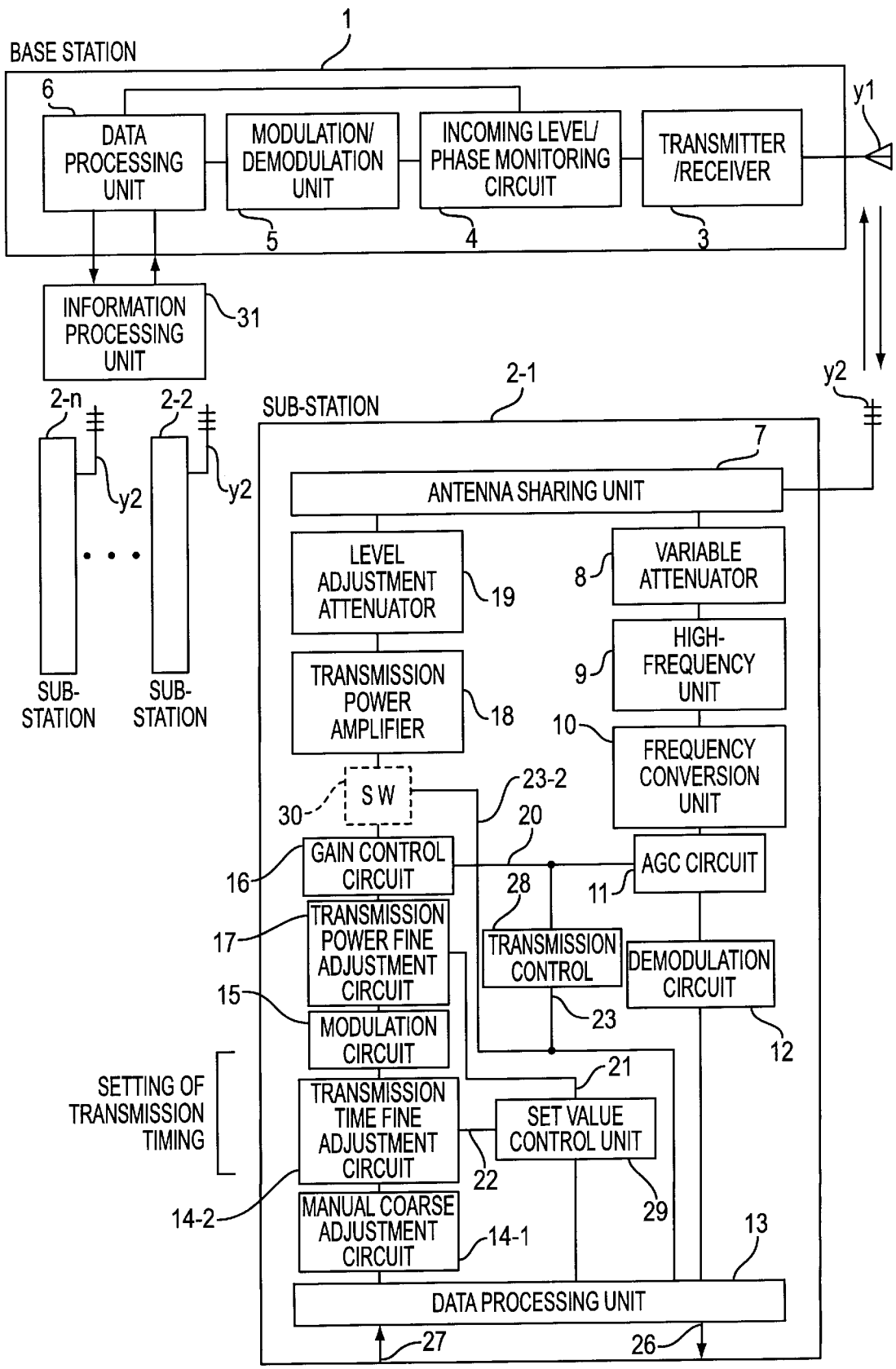
FIG. 11 is a block diagram schematically illustrating a radio communication system according to a sixth embodiment of the present invention.

FIG. 11 is a block diagram schematically illustrating a radio communication system according to the sixth embodiment of the present invention. In this radio communication system, the automatic control function of the transmission gain in the first embodiment shown in FIG. 1, the fine adjustment function of the transmission power in the second embodiment shown in FIG. 6, the transmission (stop) control function in the third embodiment shown in FIG. 7 and the fine adjustment function of the transmission timing in the fourth embodiment shown in FIG. 8 are provided in the sub-stations 2-1 to 2-n.

With such a configuration, since the transmission power and the transmission timing of the sub-stations 2-1 to 2-n can be controlled by control of the base station 1, the received levels and timings from the sub-stations 2-1 to 2-n received by the base station 1 can be optimized to reduce the interference between symbols adjacent in the time relation. Further, when the AGC voltage 20 of the AGC circuit 11 exceeds the predetermined value (or smaller than or equal to the predetermined value in a certain circuit configuration) (that is, when the received level is smaller than or equal to the predetermined value), the transmission control circuit 28 controls the data control unit 13 to reserve transmission of data. Accordingly, occurrence of error due to transmission of data under bad conditions can be avoided to prevent reduction of the transmission efficiency.

Figure 12:
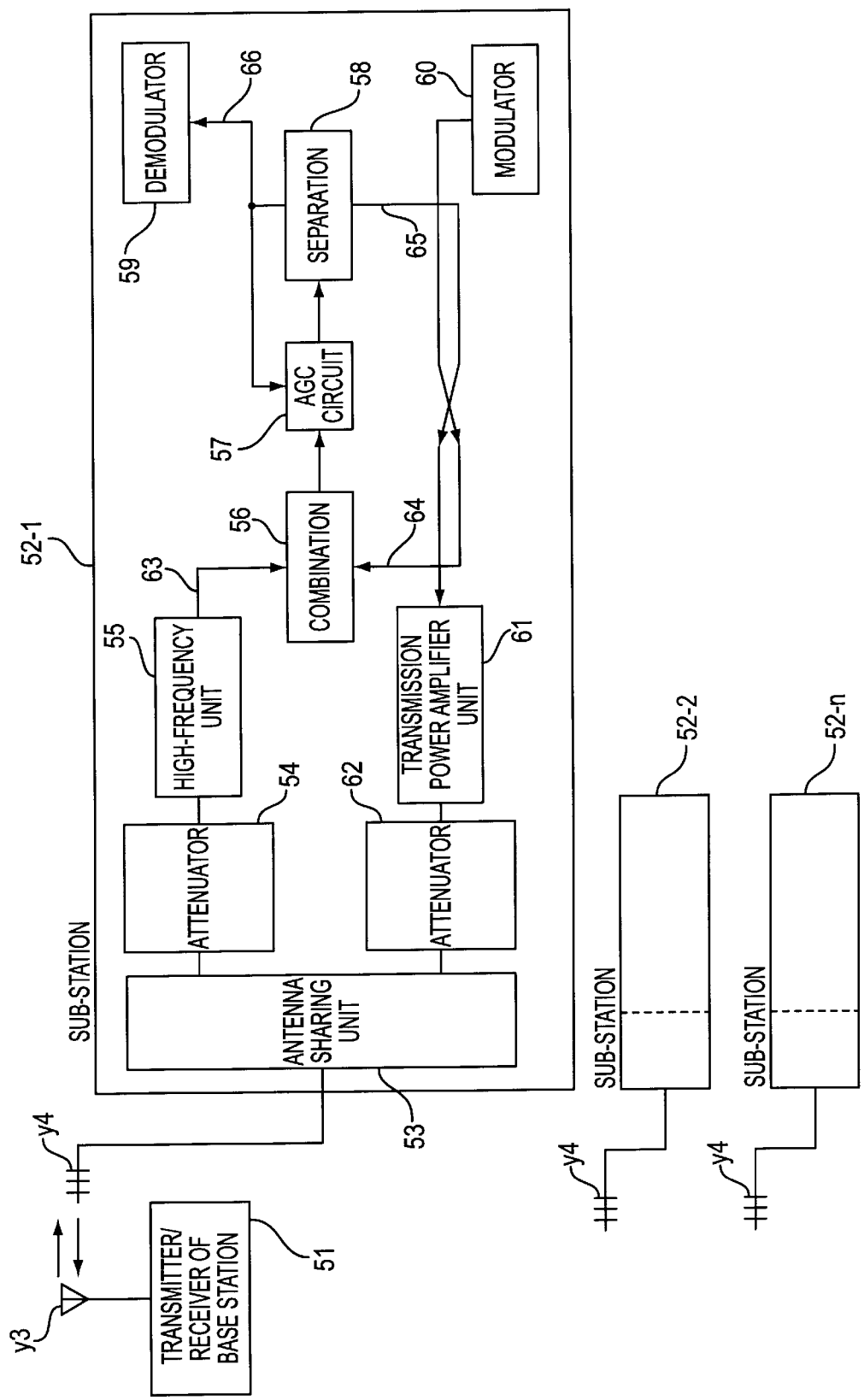
FIG. 12 is a block diagram schematically illustrating a radio communication system according to a seventh embodiment of the present invention.

FIG. 12 is a block diagram schematically illustrating a radio communication system according to a seventh embodiment of the present invention. The radio communication system includes one base station 51 and a plurality of sub-stations 52-1 to 52-n. The sub-station 52-1 includes an antenna sharing unit 53 for sharing an antenna y4 by a transmission processing system and a reception processing unit, a variable attenuator 54 for attenuating a signal (high frequency signal) received when the intensity of an electric field is high, a high-frequency unit 55 for subjecting the received high frequency signal to band restriction and amplification, a received signal/transmission signal combination circuit 56 for combining the received signal and the transmission signal, an AGC circuit 57 for adjusting a level of the combined received signal/transmission signal, a received signal/transmission signal separation unit 58 for separating the received signal and the transmission signal, a demodulator 59 for demodulating the received signal, a modulator 60 for modulating the transmission signal, a transmission power amplifier 61 for amplifying the transmission signal, and a transmission power adjustment attenuator 62 for adjusting the transmission power. Other sub-stations 52-2 to 52-n are also configured in the same manner as the sub-station 52-1.

In the sub-station 52-1 thus configured, the transmission signal transmitted by the base station 51 is supplied through the antenna y4 and the antenna sharing unit 53 to the attenuator 54 to be attenuated and is supplied to the high-frequency unit 55. The high-frequency unit 55 converts the received signal to the intermediate frequency to supply it to the received signal/transmission signal combination unit 56.

The received signal/transmission signal combination unit 56 combines the received signal 63 from the high-frequency unit 55 with the transmission signal 64 to supply the combined signal to the AGC circuit 57. The AGC circuit 57 adjusts the amplification degree so that a signal input level 66 of the demodulator 59 is set to a fixed level. The demodulator 59 demodulates the received signal separated from the output of the AGC circuit 57 and produces received data such as voice data.

Further, when the modulator 60 is supplied with transmission data such as voice data, the modulator 60 modulates the transmission data to form a transmission signal and supplies the transmission signal to the received signal/ transmission signal combination unit 56. The AGC circuit 57 amplifies the transmission signal with the same amplification degree as that for the received signal and supplies the amplified transmission signal to the received signal/ transmission signal separation unit 58. Since the amplification degree of the AGC circuit 57 is adjusted so that the signal input level 66 of the demodulator 59 is set to a fixed level as described above, the amplification degree is substantially equal to an amount of reduction of the received level of the received signal from the base station 51 due to fading. Accordingly, the transmission signal is amplified in consideration of reduction of level due to the fading. The received signal/transmission signal separation unit 58 separates the transmnission signal from the output of the AGC circuit 57 and supplies the transmission signal to the transmission power amplification unit 61. The transmission level of the transmission signal amplified by the transmission power amplification unit 61 is adjusted by the attenuator 62 and the transmission signal is then transmitted through the antenna sharing unit 53 and the antenna 53 to the base station 51.

Figure 13:
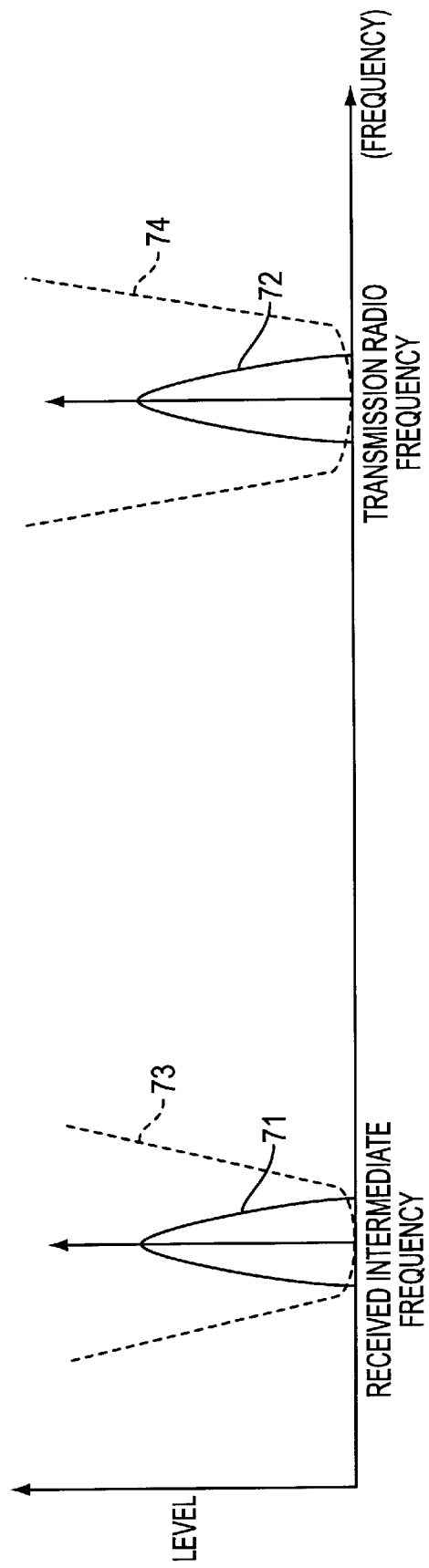
FIG. 13 shows an example of the relation of the frequency of the received signal passing through the AGC circuit constituting the radio communication system and the frequency of the transmission signal.

FIG. 13 shows an example of the relation of the received signal and the transmission signal having the level adjusted by the AGC circuit 57 of the sub-station 52-1 thus structured. In FIG. 13, numeral 71 represents an example of the spectrum of the received signal of the intermediate frequency, 72 an example of the spectrum of the transmission signal, 73 an example of the attenuation factor characteristic of the band pass filter (BPF) for separating the received signal of the intermediate frequency in the received signal/transmission signal separation unit 58, and 74 an example of the attenuation factor characteristic of the band pass filter for separating the transmission signal in the received signal/transmission signal separation unit 58. The received intermediate frequency 63 produced from the high-frequency unit 55 and the frequency of the output 64 of the modulator are desired to be sufficiently separated from each other so that both the frequencies can be separated easily in the received signal/transmission signal separation unit 58.

In the radio communication system, since the transmission signal is amplified in the AGC circuit 57 with the amplification degree so that the level of the received signal varied due to the fading is maintained to be fixed, the level of the transmission signal amplified by the AGC circuit 57 is inversely proportional to variation of the level of the received signal completely. Accordingly, by amplifying the transmission signal by the transmission power amplification unit 61 and transmitting it, the propagation loss due to the fading can be compensated with the transmission power on the side of the sub-station and the level of the received signal received by the base station 51 can be maintained to be fixed.

The present invention is not limited to the above embodiments and can be modified properly. For example, the format of the transmission signal from the base station to the sub-station or from the sub-station to the base station is not limited to the format shown in FIG. 2. As shown in FIG. 14, for example, all (65536) sub-stations may be divided into about 256 segments and the synchronizing signal and a segment number may be added in each group to be transmitted.

In the radio communication system according to the present invention, every data from the sub-stations is assigned only in the predetermined position of the data format in the time division multiple access system. More definitely, a sub-station is inhibited from putting the data at one of the other positions for the other sub-stations: but is allowed to accurately the data at the position for the sub-station itself. Accordingly, the guard bits between the data of a sub-station and the data of another sub-station can be reduced, which increases in amount of data transmitted during a given time, that is, leads to improvement of transmission throughput.

For the transmission timing control of the sub-stations, the base sub-station monitors each of those sub-station to notify each thereto the errors between the predetermined reference timing which the respective data should be laid and the receipt timing of the accrual data, and also each of the sub-stations adjusts based on the error the time to transmit data to base station in such a fashion that the error is reduced. This permits the guard bits between the data of one sub-station and the data of another sub-station to further reduced, thus enhancing the transmission throughput.

With the transmission power control of the sub-stations, on the condition that a transmission frequency of the sub-stations interrelates with another frequency of the base-station the sub-stations watch the radio wave received from the base station to judge the fading between the sub-station and the base station, and further control the transmission power on the basis of the respective judgment of the fading so as to allow the transmission power received at the base station to be similar to the other transmission powers received thereat. This reduces the interference between the data adjacent to each other, hence enabling the above data format to hold in any fading situations with the transmission throughput maintained.

What is claimed is:

1. A radio communication system, comprising:
a non-mobile base station for performing communication by a radio wave, wherein said base station includes:
    comparison means for comparing a time slot in a reference data string for regulating the time slot with a position of data corresponding to said time slot in the data string transmitted actually by a plurality of non-mobile sub-stations to thereby extract a timing error of said data with respect to said time slot; and
    timing error transmission means for transmitting said timing error to said plurality of sub-stations, and
    wherein each of said plurality of sub-stations includes transmission timing correction means for correcting a timing for transmitting said data to said base station on the basis of said timing error transmitted by said base station so as to reduce said timing error; and
    are located within a specific distance from said base station each for transmitting by radio waves to said base station data of several bits to be collected instantaneously by said base station,
    wherein the data each are assigned at a predetermined time slot in said data string of the time division multiple access system.

2. A radio communication system according to claim 1, wherein said transmission timing correction means corrects the timing for transmitting said data in consideration of a necessary time of data communication which is different for each of location places of said plurality of sub-stations and is depending on radio wave propagation conditions between said base station and each sub-station.

3. A radio communication system according to claim 1, wherein said base station includes:

data transmission time designation means for designating, for each of said plurality of sub-stations, time that said plurality of sub-stations are to transmit data to said base station;

data reception time monitoring means for monitoring, for each of said plurality of sub-stations, actually received time of data from said plurality of sub-stations;

time difference calculating means for calculating a time difference between the time that said data is to be transmitted and the received time of said data; and time difference notification means for notifying the time difference to each of said plurality of sub-stations; and said transmission timing correction means corrects said timing on the basis of said notified time difference.

4. A radio communication system comprising:

a non-mobile base station for performing communication by a radio wave; and a plurality of non-mobile sub-stations are located within a specific distance from said base station each for transmitting by radio waves to said base station data of several bits to be collected instantaneously by said base station, wherein a first frequency used by said base station and a second frequency used by said sub-stations have the interrelation in terms of fading; and each of said plurality of sub-stations includes:

received power monitoring means for monitoring received power of radio waves of said first frequency from said base station;

fading situation judgement means for judging a situation of fading on the basis of the received power monitored; and transmission power correction means for correcting transmission power of radio waves of said second frequency to said base station on the basis of said judged fading situation in order to prevent one data transmitted by the sub-station itself from interfering with another data transmitted by another sub-station, wherein the data each are assigned at a predetermined time slot in a data string of the time division multiple access system.

5. A radio communication system according to claim 4, wherein said base station includes:

received power monitoring means for monitoring, for each of said plurality of sub-stations, received power of radio waves of said second frequency from said plurality of sub-stations;

received power error calculating means for calculating, for each of said plurality of sub-stations, an error between said monitored received power and a predetermined reference received power; and received power error notification means for notifying, for each of said plurality of sub-stations, said calculated error of received power to said plurality of sub-stations; and said transmission power correction means corrects said transmission power of radio waves of said second frequency to said base station on the basis of said error of received power notified to the sub-station itself.

6. A radio communication system according to claim 5, wherein said base station includes:

pseudo data transmission indication means for indicating said plurality of sub-stations to transmit pseudo data; and said received power error notification means notifies the error of the received power of radio waves of said second frequency containing said pseudo data transmitted by said plurality of sub-stations and corrects the transmission power of radio waves of said second frequency to said base station on the basis of the notified error of the received power of radio waves of said second frequency.

* * * * *